US012658845B2

(12) United States Patent
Hao et al.

(10) Patent No.: US 12,658,845 B2
(45) Date of Patent: Jun. 16, 2026

(54) PHOTOVOLTAIC MODULE

(71) Applicant: Huawei Digital Power Technologies Co., Ltd., Shenzhen (CN)

(72) Inventors: Yuetong Hao, Shenzhen (CN); Chongyue Huang, Shanghai (CN); Jiebin Cheng, Dongguan (CN); Fangdong Bao, Nanjing (CN); Yufei He, Shenzhen (CN); Di Zhou, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 50 days.

(21) Appl. No.: 18/767,014

(22) Filed: Jul. 9, 2024

(65) Prior Publication Data

US 2025/0055416 A1 Feb. 13, 2025

(30) Foreign Application Priority Data

Aug. 7, 2023 (CN) .......................... 202310988243.X

(51) Int. Cl.
| | |
|---|---|
| H05K 5/02 | (2006.01) |
| H02S 20/20 | (2014.01) |
| H02S 40/32 | (2014.01) |

(52) U.S. Cl.
CPC .............. H02S 40/32 (2014.12); H02S 20/20 (2014.12)

(58) Field of Classification Search
CPC ........................... H05K 5/0017; H05K 5/0217

USPC ......................................... 361/807, 809, 810
See application file for complete search history.

(56) References Cited

U.S. PATENT DOCUMENTS

| | | | |
|---|---|---|---|
| 10,312,855 B2 | 6/2019 | Lester et al. | |
| 2013/0271926 A1* | 10/2013 | Marroquin | H10F 19/80 |
| | | | 361/747 |
| 2014/0000186 A1 | 1/2014 | Yen | |
| 2019/0221696 A1* | 7/2019 | Kubo | H10F 19/80 |

FOREIGN PATENT DOCUMENTS

| | | |
|---|---|---|
| CN | 204031064 U | 12/2014 |
| CN | 205123679 U | 3/2016 |
| CN | 214901606 U | 11/2021 |
| CN | 215167334 U | 12/2021 |

* cited by examiner

*Primary Examiner* — Hung S. Bui
(74) *Attorney, Agent, or Firm* — Maier & Maier, PLLC

(57) ABSTRACT

A photovoltaic module, which includes a module, a module frame, a mounting piece, and a power converter. The module covers the module frame. The module frame includes a plurality of frame sides. Each frame side extends in a direction away from the module. The plurality of frame sides are sequentially connected to enclose accommodation space of the module frame. Both the mounting piece and the power converter are located in the accommodation space. The mounting piece includes a fastening portion and a support plate that are connected to each other. The fastening portion is connected to a side wall that is of one frame side and that faces the accommodation space. The support plate extends toward an inside of the accommodation space in a direction away from the fastening portion. The power converter is detachably connected to the support plate.

14 Claims, 8 Drawing Sheets

Photovoltaic power generation system 100

| Photovoltaic string 10 | | Direct current converter 20 | Inverter 30 | Grid-connected transformer 200 | Power grid 300 |
|---|---|---|---|---|---|
| Photovoltaic module 1 | ... | | | | |

101

102

101

PHOTOVOLTAIC MODULE

CROSS-REFERENCE OF RELATED APPLICATION

This application claims priority to Chinese Patent Application No. 202310988243.X, filed on Aug. 7, 2023, the disclosure of which is hereby incorporated by reference in its entirety.

TECHNICAL FIELD

The embodiments relate to the field of energy storage technologies and to a photovoltaic module.

BACKGROUND

As photovoltaic power generation technologies gradually become mature, the photovoltaic power generation technologies are increasingly widely applied in various fields. The photovoltaic power generation technology mainly converts light energy into electric energy by using a photovoltaic power generation system, and a key that affects an electric energy yield of the photovoltaic power generation system is a power generation capability of a photovoltaic module.

A mounting factor such as a mounting tilt angle or an orientation, an environmental factor such as dust, and a factor such as object blocking all affect the power generation capability of the photovoltaic module. Therefore, a converter is usually disposed in the photovoltaic module, to implement module-level energy optimization. The converter may be configured to perform control such as monitoring, safe turning-off, or power optimization on the photovoltaic module, so that the photovoltaic module is quickly turned off in an emergency such as a fire while maximum energy management of the photovoltaic module is implemented.

Currently, the converter and the photovoltaic module are mostly assembled at a construction site. The converter is mainly secured to an outer side of a frame of the photovoltaic module through a fastener such as a screw. This mounting manner is costly and time-consuming. Consequently, overall efficiency of station construction is affected. However, if the converter and the photovoltaic module are pre-integrated before the photovoltaic module is delivered from a factory, because the converter is still secured to the outer side of the frame of the photovoltaic module through the screw, a part of the screw protrudes from the outer side of the frame of the photovoltaic module. In this case, when a plurality of photovoltaic modules are packed, the part that is of the screw and that protrudes from the outer side of the frame increases a spacing between two adjacent photovoltaic modules. Consequently, a packing rate of the photovoltaic module is reduced, and transportation costs of the photovoltaic module are increased.

SUMMARY

The embodiments provide a photovoltaic module, to improve a packing rate of the photovoltaic module and reduce transportation costs of the photovoltaic module.

The embodiments provide a photovoltaic module. The photovoltaic module includes a module, a module frame, a mounting piece, and a power converter. The module covers the module frame, and an edge of the module is connected to the module frame. The module frame includes a plurality of frame sides. Each frame side extends in a direction away from the module. The plurality of frame sides are sequentially connected to enclose accommodation space. Both the mounting piece and the power converter are located in the accommodation space. The mounting piece includes a fastening portion and a support plate. The fastening portion is connected to the support plate. The fastening portion is connected to a side wall that is of one frame side and that faces the accommodation space. The support plate extends toward an inside of the accommodation space in a direction away from the fastening portion. The power converter is detachably connected to the support plate. In the photovoltaic module provided in the embodiments, because the mounting piece is located in the accommodation space of the module frame, after being connected to the mounting piece, the power converter may be hidden in the accommodation space of the module frame, so that the mounting piece and the power converter do not occupy additional space outside the accommodation space of the module frame. This helps reduce a size of the photovoltaic module, improve a packing rate of the photovoltaic module, and reduce transportation costs of the photovoltaic module.

In a possible implementation of the embodiments, the power converter includes a mounting ear. The mounting ear is of a plate structure. The mounting ear includes a mounting hole. The mounting piece further includes a clipping structure. The clipping structure is located in the accommodation space. The clipping structure is disposed on a surface that is of the support plate and that faces the module. In addition, the clipping structure is located between the module and the support plate. The clipping structure is fastened to the mounting hole in a movable and snapping manner, to clip and fasten the mounting ear, so that the power converter is reliably connected to the mounting piece.

In a possible implementation of the embodiments, one end of the clipping structure is connected to the support plate, and the other end of the clipping structure is capable of moving in directions away from and toward the support plate. The mounting ear may be located between the clipping structure and the support plate, to fasten the power converter, and the mounting ear is detachably connected to the clipping structure, so that the power converter is detachably connected to the mounting piece.

In a possible implementation of the embodiments, the support plate includes a first guide groove, a second guide groove, and a support surface. An opening of the first guide groove and an opening of the second guide groove are disposed opposite to each other, and are connected to each other through the support surface. Extension directions of the first guide groove and the second guide groove are perpendicular to the fastening portion. In addition, the mounting ear of the power converter may be inserted into space enclosed by the first guide groove and the second guide groove. In this case, in a process of mounting the mounting ear to the mounting piece and a process of detaching the mounting ear from the mounting piece, the mounting ear is capable of sliding along the first guide groove and the second guide groove, so that the first guide groove and the second guide groove guide movement of the mounting ear relative to the support plate. This can help improve stability of the movement of the mounting ear. In this way, efficiency of mounting the mounting ear to the mounting piece and efficiency of detaching the mounting ear from the mounting piece can be improved.

In a possible implementation of the embodiments, the support plate further includes a flat plate structure. A surface of the flat plate structure is parallel to the support surface. The flat plate structure is connected to the support surface through the second guide groove. One end of the clipping structure is fastened to the flat plate structure. This helps facilitate a connection between the clipping structure and the support plate.

In a possible implementation of the embodiments, the clipping structure includes a clamping portion and a hook. The clamping portion includes a first end and a second end. The hook is located between the first end and the second end. The hook extends in a direction from the clamping portion to the support plate. The mounting ear is located between the clamping portion and the support surface, the hook is inserted into the mounting hole, and the hook is configured to limit movement of the mounting ear relative to the support plate in the direction away from the fastening portion, so that the power converter is reliably connected to the mounting piece.

In addition, the first end of the clamping portion is fastened to the flat plate structure, so that movement of the first end of the clamping portion relative to the support plate is limited. The second end of the clamping portion is capable of moving in the directions away from and toward the support plate. In this case, the second end of the clamping portion is a free end, may move in the direction away from the support plate under the action of an external force, and may move in the direction toward the support plate under the action of an elastic force of the clamping portion.

It may be understood that, in a process in which the second end of the clamping portion moves in the directions away from and toward the support plate, the hook may be driven to move in the directions away from and toward the support plate, so that relative positions of the hook and the mounting ear are adjusted, to clamp the hook to the mounting hole and separate the hook from the mounting hole. For example, when the second end of the clamping portion moves in the direction away from the support plate, the hook is separated from the mounting hole, and the mounting ear is capable of being extracted from between the clamping portion and the support plate in the direction away from the fastening portion, so that the power converter is detached from the mounting piece. To mount the power converter to the mounting piece, only the mounting ear needs to be inserted between the clamping portion and the support plate, and the hook needs to be inserted into the mounting hole. Therefore, the power converter is conveniently mounted to the mounting piece and is conveniently detached from the mounting piece.

In a possible implementation of the embodiments, the clipping structure further includes a lapping portion. The lapping portion is connected to the second end of the clamping portion. In this way, a force in a direction away from the support plate may be applied to the lapping portion, to lift the second end of the clamping portion in the direction away from the support plate, to facilitate movement of the second end of the clamping portion in the direction away from the support plate. In addition, the lapping portion is of a step-shaped structure, and a spacing between the lapping portion and the support surface is greater than a spacing between the clamping portion and the support plate. In this way, the spacing between the lapping portion and the support plate is limited, to limit the spacing between the clamping portion and the support plate.

In a possible implementation of the embodiments, the hook includes a guide surface. The guide surface is a surface that is of the hook and that is away from the fastening portion. An included angle that is between the guide surface and the support surface and that is away from the fastening portion is an acute angle. In this way, in a process of mounting the mounting ear to the mounting piece, the mounting ear can conveniently jack up the hook. This helps improve efficiency of mounting the mounting ear to the mounting piece.

In addition, the hook may further include a stop surface. The stop surface faces the fastening portion, and the stop surface is perpendicular to the support surface. Therefore, when the hook is inserted into the mounting hole of the mounting ear, the stop surface may limit the movement of the mounting ear in the direction away from the fastening portion. This can effectively prevent the mounting ear from falling off from the mounting piece. In addition, when the mounting ear needs to be detached from the mounting piece, a design of the stop surface can facilitate separation of the hook from the mounting hole. This helps improve efficiency of detaching the mounting ear from the mounting piece.

In a possible implementation of the embodiments, the support plate is further provided with an avoidance hole. The avoidance hole is disposed opposite to the hook. A part of the hook is inserted into the avoidance hole. Through such a design, the hook can be inserted into the avoidance hole while being inserted into the mounting hole of the mounting ear. This helps improve a blocking function of the hook on the movement of the mounting ear relative to the support plate. In this way, reliability of a connection between the mounting ear and the mounting piece can be improved.

In a possible implementation of the embodiments, the mounting piece further includes a baffle. The baffle is connected to the support plate via the first guide groove. The baffle is perpendicular to the module, and the baffle is perpendicular to the fastening portion. In addition, the baffle includes a through hole, and the clipping structure may pass through the baffle via the through hole. The clipping structure passes through the baffle via the through hole, so that movement displacement of the clipping structure toward the support plate can be limited, and movement displacement of the clipping structure away from the support plate can also be limited. This can ensure reliability of rebounding of the clipping structure. In this way, after the force applied to the clipping structure is removed, the clipping structure can move in the direction toward the support plate under the action of the elastic force of the clipping structure. In this way, structural reliability of the mounting piece can be improved. This helps prolong a service life of the mounting piece.

In a possible implementation of the embodiments, a specific manner of connecting the fastening portion of the mounting piece to the module frame is not limited. For example, the fastening portion and the frame side of the module frame may be an integral structure. This helps improve integration of the module frame and the mounting piece.

In another possible implementation, the frame side includes a first-layer mounting plate and a second-layer mounting plate. The first-layer mounting plate and the second-layer mounting plate are spaced from each other in a direction from the outside of the accommodation space of the module frame to the inside of the accommodation space. The second-layer mounting plate is disposed close to the inside of the accommodation space relative to the first-layer mounting plate. In this case, the fastening portion of the mounting piece may be connected to the second-layer mounting plate through a connection piece, and a part of the connection piece may be accommodated between the first-layer mounting plate and the second-layer mounting plate, so that the entire connection piece can be located in the module frame. This helps reduce the size of the photovoltaic module and improve the packing rate of the photovoltaic module.

In a possible implementation of the embodiments, the module frame may further include a support portion. The support portion is connected to the frame side. The support portion is located in the accommodation space. The support portion is parallel to the module. The mounting piece is located between the support portion and the module. The support plate abuts against the support portion, so that the support portion supports the support plate. This helps improve structural reliability of the photovoltaic module.

DETAILED DESCRIPTION OF EMBODIMENTS

Terms used in the following embodiments are merely intended to describe embodiments, but are not intended as limiting. Terms "one", "a", and "this" of singular forms used in the embodiments are also intended to include expressions such as "one or more", unless otherwise specified in the context clearly. In the embodiments, the terms "include", "have", and variations thereof all mean "include but are not limited to", unless otherwise emphasized in another manner.

Figures 1, 2:
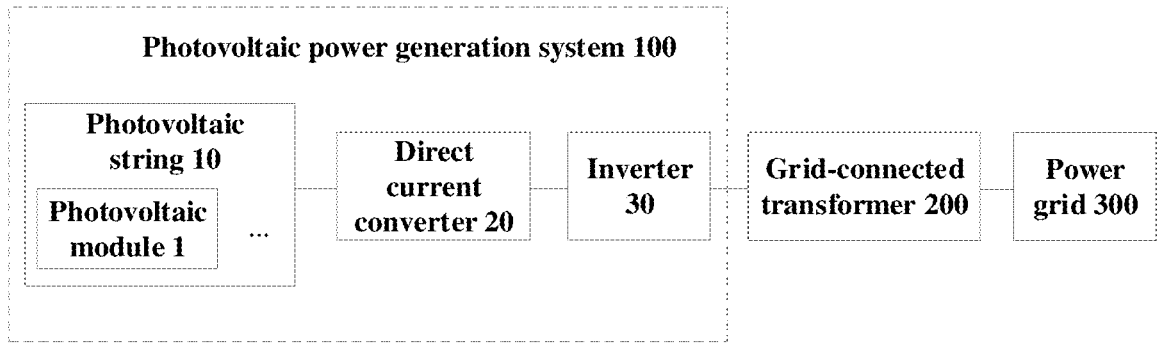
FIG. 1 is a block diagram of a structure of a photovoltaic power generation system according to an embodiment.
FIG. 2 is a diagram of an assembly structure of an existing photovoltaic module and a power converter according to an embodiment.

For ease of understanding of the photovoltaic module provided in embodiments, the following first describes an application scenario of the photovoltaic module. Light energy is a type of renewable clean energy. A photovoltaic power generation technology is widely studied, and a photovoltaic power generation industry has developed rapidly in recent years. FIG. 1 is a block diagram of a structure of a photovoltaic power generation system 100 according to an embodiment. In some embodiments, the photovoltaic power generation system 100 may include a plurality of components such as a photovoltaic string 10, a direct current converter 20, and an inverter 30. A photovoltaic module 1 in the photovoltaic string 10 can implement optical-to-electrical conversion, to convert energy of sunlight into electric energy in a form of a direct current. The direct current converter 20 may obtain electric energy from the photovoltaic module 1, perform voltage conversion on the obtained electric energy, and output converted electric energy. The inverter 30 may receive the electric energy output by the direct current converter 20, convert the electric energy, in a form of a direct current, output by the direct current converter 20 into electric energy in a form of an alternating current, and output the electric energy to a power grid 300 by using a grid-connected transformer 200, to implement a grid connection of the photovoltaic power generation system 100.

The photovoltaic module 1 is a core component of the photovoltaic power generation system 100 for power generation, and operating stability of the photovoltaic module 1 is a key factor that affects a power generation capability of the photovoltaic power generation system 100. However, a mounting factor such as a mounting tilt angle or an orientation, an environmental factor such as dust, and a factor such as object blocking all affect the operating stability of the photovoltaic module 1. Therefore, a power converter such as an optimizer or a micro inverter may be disposed in the photovoltaic module 1, to implement module-level energy optimization, to perform control such as monitoring, safe turning-off, or power optimization on the photovoltaic module 1 by using the power converter, so that the photovoltaic module 1 is quickly turned off in an emergency such as a fire while maximum energy management of the photovoltaic module 1 is implemented.

Currently, when the photovoltaic power generation system 100 is constructed, both the photovoltaic module 1 and the power converter 101 can be transported to a construction site, and the photovoltaic module 1 and the power converter 101 are assembled at the construction site. FIG. 2 is a diagram of an assembly structure of an existing photovoltaic module 1 and a power converter 101 according to an embodiment. When the photovoltaic module 1 and the power converter 101 are assembled, the power converter 101 can be secured to an outer side of a module frame 102 of the photovoltaic module 1 through a connection piece such as a screw. This mounting manner is costly and time-consuming. Consequently, overall efficiency of station construction is affected. If the power converter 101 and the photovoltaic module 1 are pre-integrated before the photovoltaic module 1 is delivered from a factory, because the power converter 101 is still secured to the outer side of the module frame 102 through the screw, a part of the screw protrudes from the outer side of the module frame 102, and the part of the screw occupies additional space outside the module frame 102. In this case, when a plurality of photovoltaic modules 1 are packed, the part that is of the screw and that protrudes from the outer side of the module frame 102 increases a spacing between two adjacent photovoltaic modules 1. Consequently, a packing rate of the photovoltaic module 1 is reduced, and transportation costs of the photovoltaic module 1 are increased. In addition, in a transportation process, there is a risk that the screw is loose. Consequently, reliability of a connection between the power converter 101 and the module frame 102 cannot be ensured.

In view of this, in the photovoltaic module provided in the embodiments, a mounting piece is disposed on an inner side of a module frame, so that the power converter is connected to the mounting piece, to pre-mount the power converter to the frame before delivery. In this way, the power converter can be hidden on the inner side of the module frame, and the power converter does not occupy space outside the module frame. In this way, when a plurality of photovoltaic modules are packed, a spacing between two adjacent photovoltaic modules is small. This can effectively improve a packing rate of the photovoltaic module. In this way, transportation costs of the photovoltaic module can be reduced. To make objectives, solutions, and advantages of the embodiments clearer, the following further describes the embodiments in detail with reference to the accompanying drawings.

Figure 3A:
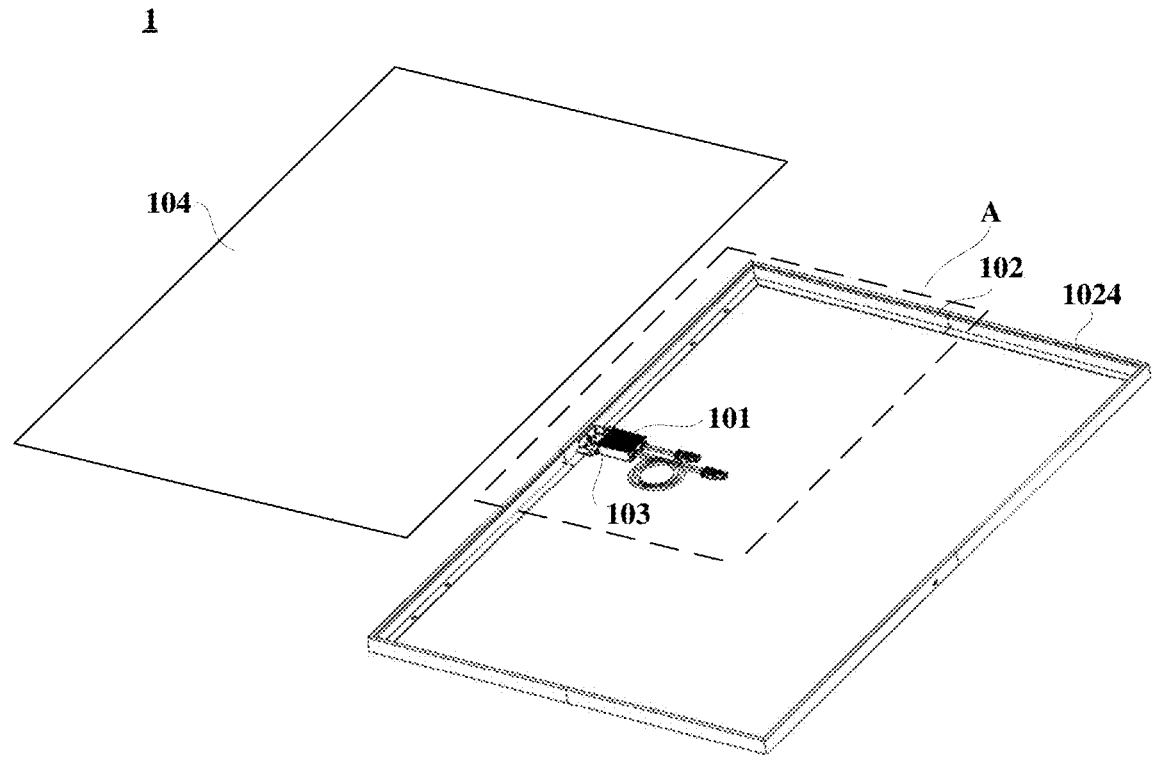
FIG. 3*a* is a diagram of a structure of a photovoltaic module according to an embodiment.

FIG. 3a is a diagram of a structure of a photovoltaic module 1 according to an embodiment. The photovoltaic module 1 includes a power converter 101, a module frame 102, a mounting piece 103, and a module 104. The module frame 102 may be a rectangular frame. This helps facilitate layout of the photovoltaic module 1. In addition, the module frame 102 may be used as a bearing component for the photovoltaic module 1, and may be configured to support a structure such as the module 104 of the photovoltaic module 1. Therefore, the module frame 102 may be made of some materials with strong resistance to mechanical impact. For example, the module frame 102 may be made of aluminum alloy, so that structural reliability of the module frame 102 is good.

The module 104 may cover the module frame 102, and an edge of the module 104 is connected to the module frame 102. In this embodiment, a specific manner of connecting the module 104 to the module frame 102 is not limited. For example, as shown in FIG. 3a, the module frame 102 may be provided with a groove 1024, and the module 104 may be inserted into the groove 1024, so that the module 104 is connected to the module frame 102. In another possible embodiment, the module 104 may alternatively be connected to the module frame 102 through bonding, snap-fit fastening, or the like. Details are not described herein one by one.

Figure 3B:
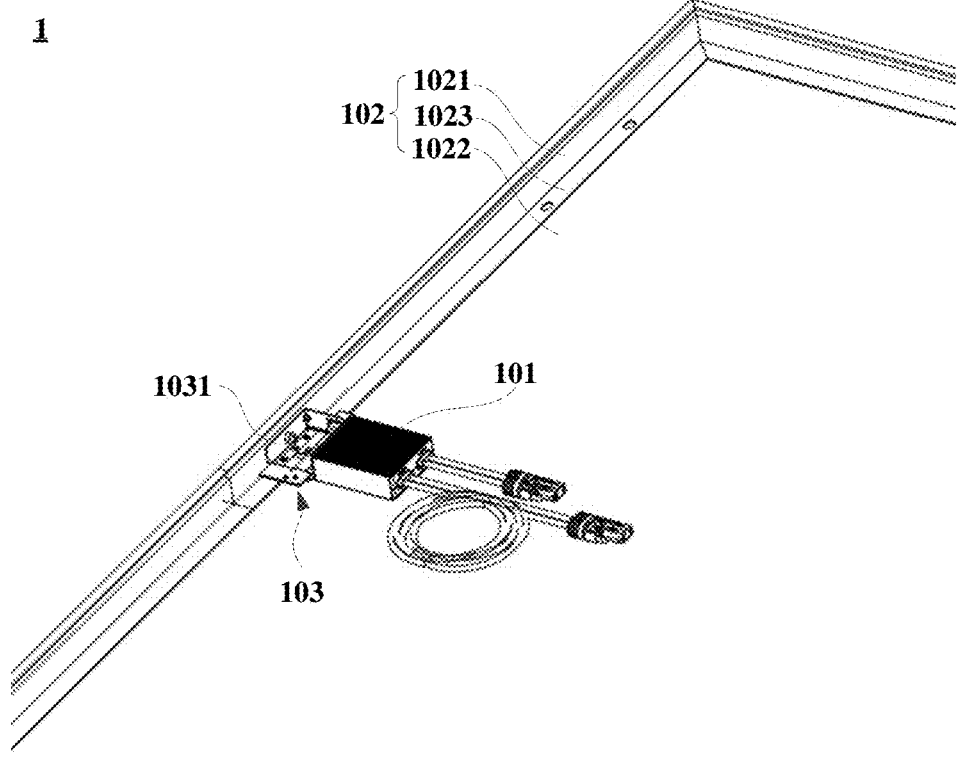
FIG. 3*b* is an enlargement view of a partial structure at a position A of the photovoltaic module provided in FIG. 3*a;*

FIG. 3b is an enlargement view of a partial structure at a position A of the photovoltaic module 1 provided in FIG. 3a. The module frame 102 may include a plurality of frame sides 1021. Each frame side 1021 extends in a direction away from the module 104. In some possible embodiments, each frame side 1021 may be further perpendicular to the module 104, to improve reliability of support of the frame side 1021 for the module 104. In addition, as shown in FIG. 3b, the plurality of frame sides 1021 are sequentially connected to enclose accommodation space 1022. The mounting piece 103 is located in the accommodation space 1022, and the mounting piece 103 is connected to one frame side 1021.

Figure 4:
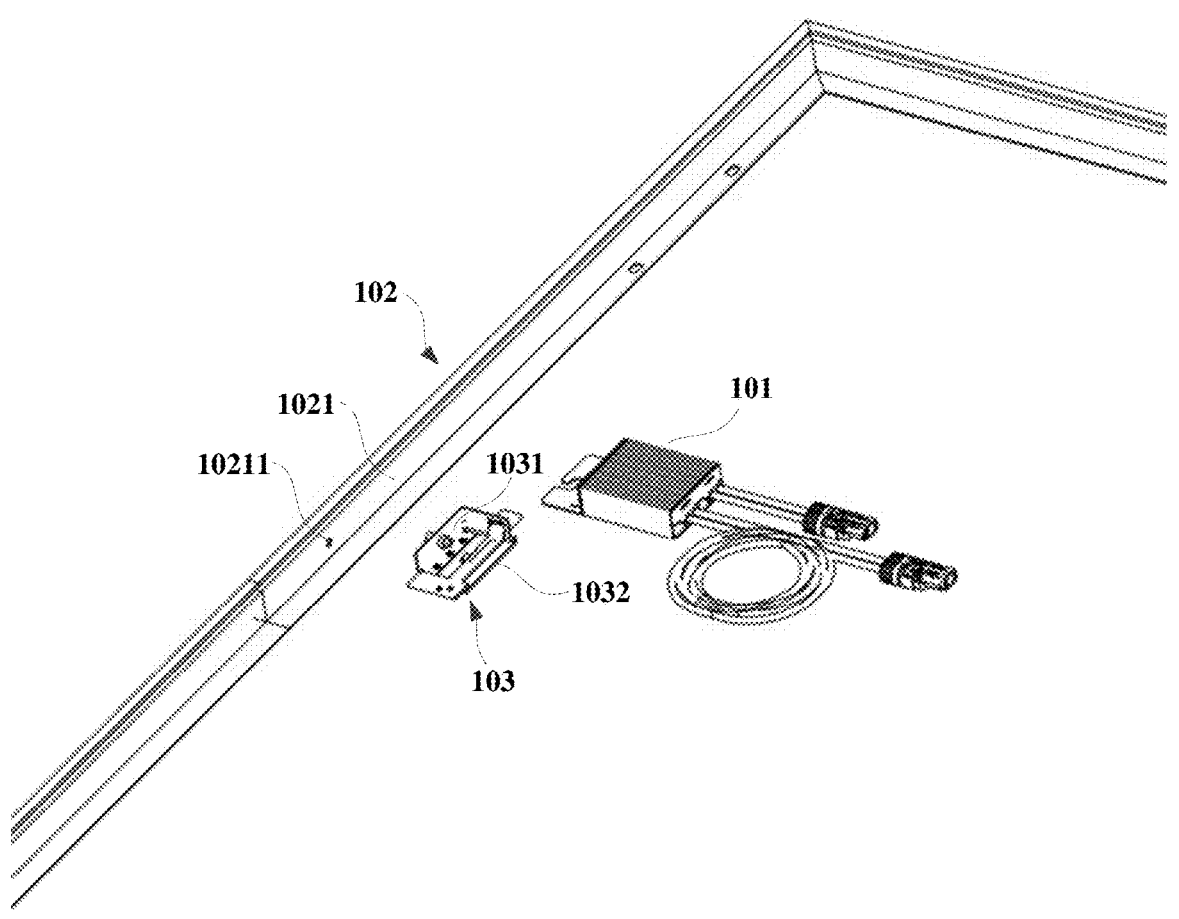
FIG. 4 is an exploded view of the structure shown in FIG. 3*a;*

For example, when the mounting piece 103 is connected to the frame side 1021, the mounting piece 103 may include a fastening portion 1031. The fastening portion 1031 may be perpendicular to the module 104. In this way, when the frame side 1021 is perpendicular to the module 104, reliability of a connection between the fastening portion 1031 and the module 104 can be improved. In addition, the fastening portion 1031 is connected to a side wall that is of one frame side 1021 and that faces the accommodation space 1022, to connect the mounting piece 103 to the frame side 1021. In this embodiment, a specific manner of connecting the mounting piece 103 to the frame side 1021 is not limited. For example, in the photovoltaic module 1, the fastening portion 1031 is detachably connected to the frame side 1021. During specific implementation, FIG. 4 is an exploded view of the structure shown in FIG. 3a. The fastening portion 1031 includes a first connection hole (not shown in FIG. 4). The frame side 1021 includes a second connection hole 10211. The first connection hole is disposed opposite to the second connection hole 10211. In this way, the fastening portion 1031 can be connected to the frame side 1021 through a connection piece, such as a screw, that sequentially passes through the first connection hole and the second connection hole 10211. This can facilitate the connection between the mounting piece 103 and the frame side 1021 and replacement of the mounting piece 103, to facilitate maintenance of the photovoltaic module 1.

It should be noted that, in the embodiments, the second connection hole 10211 may be a threaded hole, so that the connection piece can be connected to the second connection hole 10211 through a threaded connection, to connect the fastening portion 1031 to the frame side 1021. This can effectively prevent the connection piece from occupying space outside the module frame 102, and therefore helps improve a packing rate of the photovoltaic module 1.

In some possible embodiments, the fastening portion 1031 may alternatively be connected to the frame side 1021 through welding or riveting. Alternatively, the fastening portion 1031 and the frame side 1021 may be an integral structure. In other words, the fastening portion 1031 and the correspondingly connected frame side 1021 are obtained through one manufacturing process. This can effectively improve structural reliability of the photovoltaic module 1.

Still refer to FIG. 4. The mounting piece 103 may further include a support plate 1032. The support plate 1032 is connected to the fastening portion 1031. The support plate 1032 extends toward an inside of the accommodation space 1022 in a direction away from the fastening portion 1031. In the embodiments, a manner of connecting the support plate 1032 to the fastening portion 1031 is not limited. For example, the support plate 1032 may be connected to the fastening portion 1031 through a threaded connection, welding, riveting, or the like. In some possible embodiments, the support plate 1032 and the fastening portion 1031 may alternatively be an integral structure, so that structural reliability of the mounting piece 103 is improved.

In this embodiment, the support plate 1032 of the mounting piece 103 may be parallel to the module 104. As a result, in a process of mounting the power converter 101 to the mounting piece 103 and a process of detaching the power converter 101 from the mounting piece 103, the support plate 1032 can limit and guide movement of the power converter 101. In some possible embodiments, when the support plate 1032 is configured as a flat plate structure, the support plate 1032 may not be parallel to the module 104. For example, there may be an acute angle between a plane on which the support plate 1032 is located and a plane on which the module 104 is located. In some other possible embodiments, a surface of the support plate 1032 may alternatively be an arc-shaped surface or the like.

Figure 5:
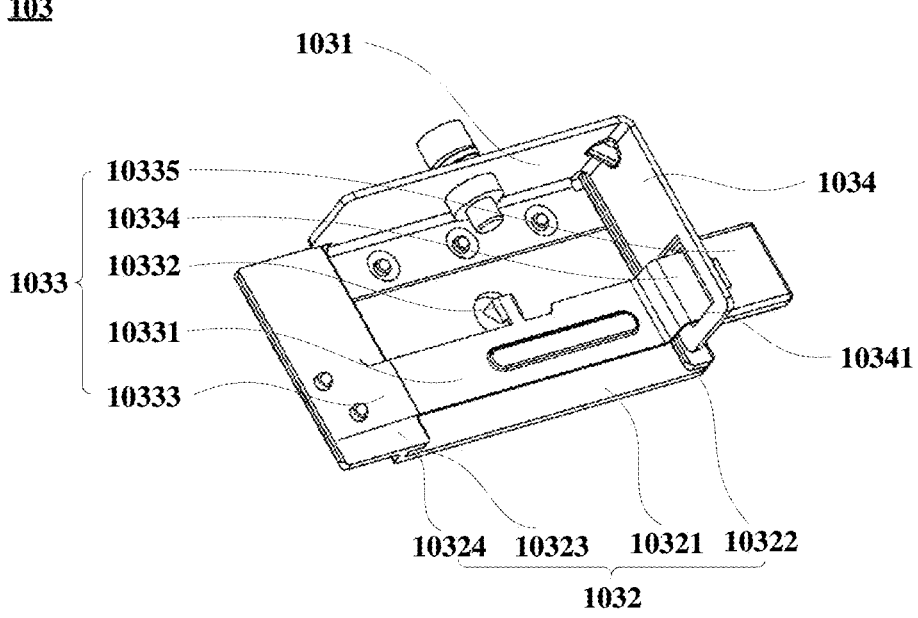
FIG. 5 is a diagram of a structure of a mounting piece according to an embodiment.

FIG. 5 is a diagram of a structure of the mounting piece 103 according to an embodiment. The mounting piece 103 may further include a clipping structure 1033. The clipping structure 1033 is located in the accommodation space 1022. The clipping structure 1033 is disposed on a surface that is of the support plate 1032 and that faces the module 104. The clipping structure 1033 is located between the module 104 and the support plate 1032. One end of the clipping structure 1033 is connected to the support plate 1032, and the other end of the clipping structure 1033 is capable of moving in directions away from and toward the support plate 1032.

For example, when the clipping structure 1033 is disposed, the clipping structure 1033 includes a clamping portion 10331 and a hook 10332. The clamping portion 10331 and the support plate 1032 are spaced from each other, and the clamping portion 10331 has an elastic force directed toward the support plate 1032. A specific manner of disposing the clamping portion 10331 is not limited. For example, the clamping portion 10331 may be of an elastic spring plate structure made of a metal material or a non-metal material.

As shown in FIG. 5, the hook 10332 is connected to the clamping portion 10331, and the hook 10332 extends in a direction from the clamping portion 10331 to the support plate 1032. In this embodiment, the hook 10332 and the clamping portion 10331 may be an integral structure. In other words, the hook 10332 may be a part of the clamping portion 10331. This can effectively improve structural reliability of the clipping structure 1033 and simplify a structure of the clipping structure 1033. In some other possible embodiments, the hook 10332 and the clamping portion 10331 may alternatively be two independently-formed structures, and the hook 10332 is connected to the clamping portion 10331 through welding, riveting, bonding, a threaded connection, or the like, so that the hook 10332 and the clamping portion 10331 can be disposed in a flexible manner. In the embodiments, a quantity of hooks 10332 of the clipping structure 1033 is not limited. There may be one hook 10332 shown in FIG. 5, or may be two or more hooks 10332. The quantity of hooks 10332 may be selected based on a structure connected to the mounting piece 103.

In the embodiments, a first end of the clamping portion 10331 is connected to the support plate 1032, to connect the clipping structure 1033 to the support plate 1032. In addition, to facilitate the connection between the first end of the clamping portion 10331 and the support plate 1032, the clipping structure 1033 may further include a connection portion 10333. The connection portion 10333 is connected to the first end of the clamping portion 10331, and the connection portion 10333 is connected to the support plate 1032. In this way, the first end of the clamping portion 10331 is connected to the support plate 1032 through the connection portion 10333, to limit movement of the first end of the clamping portion 10331 relative to the support plate 1032. In this embodiment, a manner of connecting the connection portion 10333 to the support plate 1032 is not limited. For example, the manner may be welding, bonding, riveting, or a threaded connection. In addition, the connection portion 10333 and the clamping portion 10331 may be an integral structure. In this case, the connection portion 10333 may be a bent portion formed by bending the first end of the clamping portion 10331. This helps simplify the structure of the clipping structure 1033.

Still refer to FIG. 5. The clamping portion 10331 further includes a second end. The hook 10332 is located between the first end and the second end. In this embodiment, the second end of the clamping portion 10331 is a free end. In other words, under the action of an external force, the second end of the clamping portion 10331 may move in a direction away from the support plate 1032, and under the action of an elastic force, the second end of the clamping portion 10331 may move in a direction toward the support plate 1032.

As shown in FIG. 5, in this embodiment, the support plate 1032 includes a support surface 10321, a first guide groove 10322, and a second guide groove 10323. The support surface 10321 faces the clamping portion 10331. An opening of the first guide groove 10322 and an opening of the second guide groove 10323 are disposed opposite to each other, and the opening of the first guide groove 10322 and the opening of the second guide groove 10323 are connected to each other through the support surface. In addition, extension directions of the first guide groove 10322 and the second guide groove 10323 are perpendicular to the fastening portion 1031.

The support plate 1032 further includes a flat plate structure 10324. A surface of the flat plate structure 10324 is parallel to the support surface 10321. The flat plate structure 10324 may be connected to the support surface 10321 through the second guide groove 10323. One end of the clipping structure 1033 may be fastened to the flat plate structure 10324. For example, the first end of the clamping portion 10331 may be fastened to the flat plate structure 10324. This helps facilitate a connection between the clipping structure 1033 and the support plate 1032.

Still refer to FIG. 5. In this embodiment, to facilitate lifting of the second end of the clamping portion 10331 in the direction away from the support plate 1032, the clipping structure 1033 may further include a lapping portion 10334. The lapping portion 10334 is connected to the second end of the clamping portion 10331. A manner of connecting the lapping portion 10334 to the second end of the clamping portion 10331 may be, but is not limited to, welding, bonding, riveting, a threaded connection, or the like. In addition, the lapping portion 10334 and the clamping portion 10331 may alternatively be an integral structure. In this case, the lapping portion 10334 may be a bent portion formed by bending the second end of the clamping portion 10331. This helps simplify the structure of the clipping structure 1033.

Figure 6:
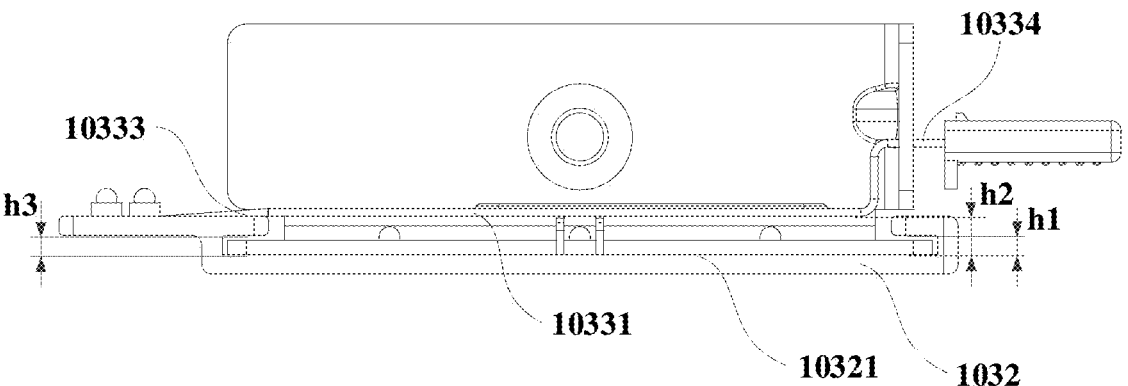
FIG. 6 is a side view of a mounting piece according to an embodiment.

FIG. 6 is a side view of the mounting piece 103 according to an embodiment. As shown in FIG. 6, the lapping portion 10334 may be of a step-shaped structure, and a spacing between a step surface of the lapping portion 10334 and the support surface 10321 may be greater than a spacing between the clamping portion 10331 and the support surface 10321. On this basis, the lapping portion 10334 may lap over another structure of the mounting piece 103, to limit a spacing between the clamping portion 10331 and the support plate 1032.

To facilitate application of a force to the lapping portion 10334, as shown in FIG. 5, the mounting piece 103 further includes a baffle 1034. The baffle 1034 is connected to the support plate 1032 through the first guide groove 10322. The baffle 1034 is perpendicular to the fastening portion 1031. The baffle 1034 is perpendicular to the module 104 shown in FIG. 3*a*. The clamping portion 10331 is located in an area enclosed by the fastening portion 1031, the support plate 1032, and the baffle 1034. The baffle 1034 includes a through hole 10341, and the lapping portion 10334 may pass through the baffle 1034 via the through hole 10341, so that the clipping structure 1033 passes through the baffle 1034 via the through hole 10341. In this way, a force in a direction away from the support plate 1032 is applied to a part that is of the lapping portion 10334 and that extends, via the through hole 10341, to the outside of the area enclosed by the fastening portion 1031, the support plate 1032, and the baffle 1034, so that the second end of the clamping portion 10331 can be lifted in the direction away from the support plate 1032. This can effectively facilitate lifting of the second end of the clamping portion 10331 in the direction away from the support plate 1032.

In this embodiment, the lapping portion 10334 passes through the baffle 1034 via the through hole 10341, so that movement displacement of the lapping portion 10334 toward the support plate 1032 can be limited, and movement displacement of the lapping portion 10334 away from the support plate 1032 can also be limited. This can ensure reliability of rebounding of the clamping portion 10331. In this way, after the force applied to the lapping portion 10334 is removed, the clamping portion 10331 can drive, under the action of an elastic force of the clamping portion 10331, the lapping portion 10334 to move in a direction toward the support plate 1032. In this way, structural reliability of the mounting piece 103 can be improved. This helps prolong a service life of the mounting piece 103.

In addition, in the embodiments, to facilitate application of a force to the lapping portion 10334, the clipping structure 1033 may be further provided with an anti-skid cap 10335. The anti-skid cap 10335 is sleeved on the lapping portion 10334. A specific material of the anti-skid cap 10335 is not limited inthe embodiments. For example, the anti-skid cap 10335 may be made of an anti-skid material such as plastic. In addition, the anti-skid cap 10335 may be connected to the lapping portion 10334 through clamping, bonding, or the like. It may be understood that, to improve anti-skid effect of the anti-skid cap 10335, an anti-skid particle, an anti-skid pattern, or the like may be disposed on a surface of the anti-skid cap 10335.

Figure 7:
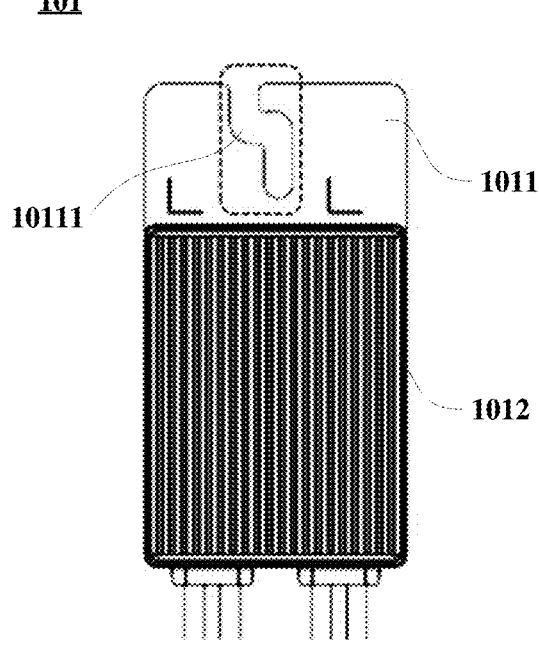
FIG. 7 is a diagram of a structure of a power converter according to an embodiment.

The power converter 101 of the photovoltaic module 1 provided in the embodimentsn may be an optimizer or a micro inverter. FIG. 7 is a diagram of a structure of a power converter 101 according to an embodiment. The power converter 101 may include a mounting ear 1011 and a main body 1012. The mounting ear 1011 may be disposed on a side surface of the main body 1012. The mounting ear 1011 may be of a plate structure, and the mounting ear 1011 may be provided with a mounting hole 10111. In the embodiments, the power converter 101 is detachably connected to the support plate 1032 of the mounting piece 103. This can facilitate replacement of the power converter 101.

Figure 8:
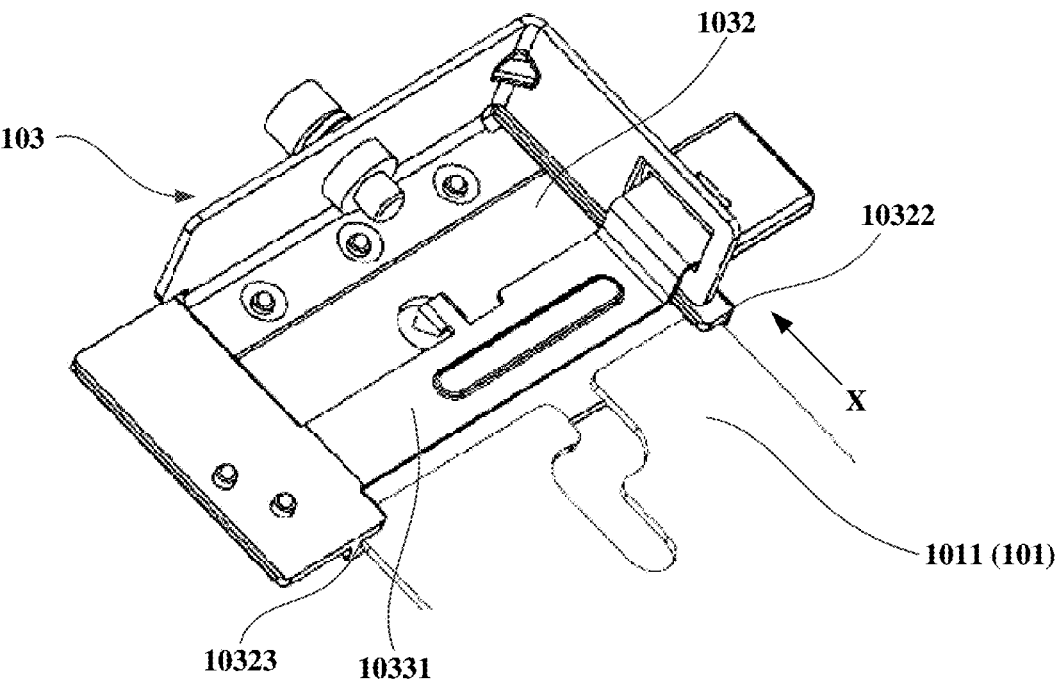
FIG. 8 is a diagram of a structure of a process of mounting a power converter to a mounting piece according to an embodiment.

For example, when the power converter 101 is connected to the mounting piece 103, refer to FIG. 8. FIG. 8 is a diagram of a structure of a process of mounting the power converter 101 to the mounting piece 103 according to an embodiment. The mounting ear 1011 of the power converter 101 is inserted between the clamping portion 10331 and the support plate 1032 through a gap between the clamping portion 10331 and the support plate 1032. A direction indicated by X in FIG. 8 is a movement direction of the mounting ear 1011 relative to the clamping portion 10331 and the support plate 1032 in the process of mounting the power converter 101 to the mounting piece 103. For ease of description, in this embodiment, the direction indicated by X may be defined as a first direction, and a direction opposite to the direction indicated by X is defined as a second direction. In this case, the second direction is a movement direction of the mounting ear 1011 relative to the clamping portion 10331 and the support plate 1032 in a process of detaching the power converter 101 from the mounting piece 103.

Still refer to FIG. 8. In the process of mounting the power converter 101 to the mounting piece 103, the mounting ear 1011 of the power converter 101 may be inserted into space enclosed by the first guide groove 10322 and the second guide groove 10323, and the mounting ear 1011 is capable of sliding along the first guide groove 10322 and the second guide groove 10323. In this case, the first guide groove 10322 and the second guide groove 10323 may guide movement of the mounting ear 1011 of the power converter 101 relative to the support plate 1032 and the clamping portion 10331. This helps improve efficiency of mounting the power converter 101 to the mounting piece 103 and efficiency of detaching the power converter 101 from the mounting piece 103.

As shown in FIG. 6, in the embodiments, to enable the mounting ear 1011 to slide along the first guide groove 10322 and the second guide groove 10323 while the mounting ear 1011 is inserted between the clamping portion 10331 and the support plate 1032, a size h1 of the first guide groove 10322 in a direction from the clamping portion 10331 to the support surface 10321 is less than the spacing h2 between the clamping portion 10331 and the support surface 10321, and a size h3 of the second guide groove 10323 in a direction from the clamping portion 10331 to the support surface 10321 is less than the spacing h2 between the clamping portion 10331 and the support surface 10321. In addition, it may be understood that the size of the first guide groove 10322 in the direction from the clamping portion 10331 to the support surface 10321 is greater than a size of the mounting ear 1011 in the direction, and the size of the second guide groove 10323 in the direction from the clamping portion 10331 to the support surface 10321 is greater than a size of the mounting ear 1011 in the direction.

Figure 9:
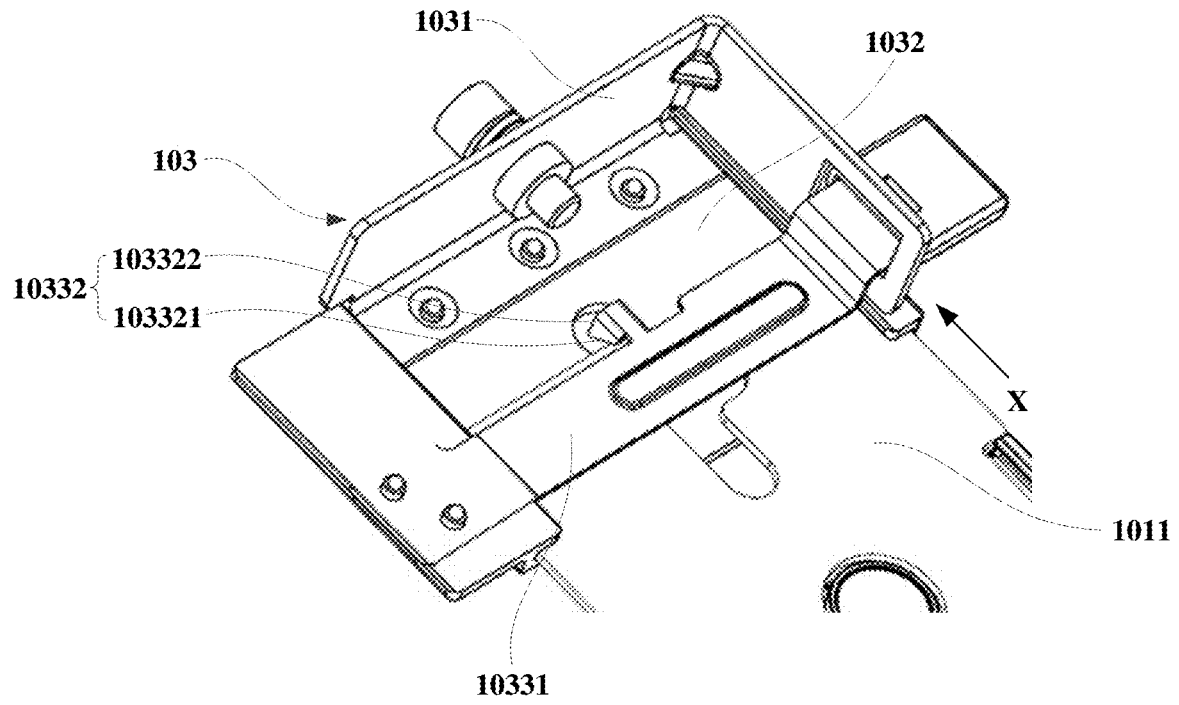
FIG. 9 is a diagram of another structure of a process of mounting a power converter to a mounting piece according to an embodiment.

Because the clipping structure 1033 is provided with the hook 10332 extending toward the support plate 1032, in a process in which the mounting ear 1011 of the power converter 101 moves in the first direction, the mounting ear 1011 interferes with the hook 10332. FIG. 9 is a diagram of another structure of a process of mounting the power converter 101 to the mounting piece 103 according to an embodiment. In FIG. 9, the mounting ear 1011 moves to the hook 10332, and the mounting ear 1011 interferes with the hook 10332. In this case, a force in the first direction may be continuously applied to the mounting ear 1011, so that the mounting ear 1011 continues to move in the first direction after squeezing the hook 10332 and jacking up the hook 10332.

Figure 10:
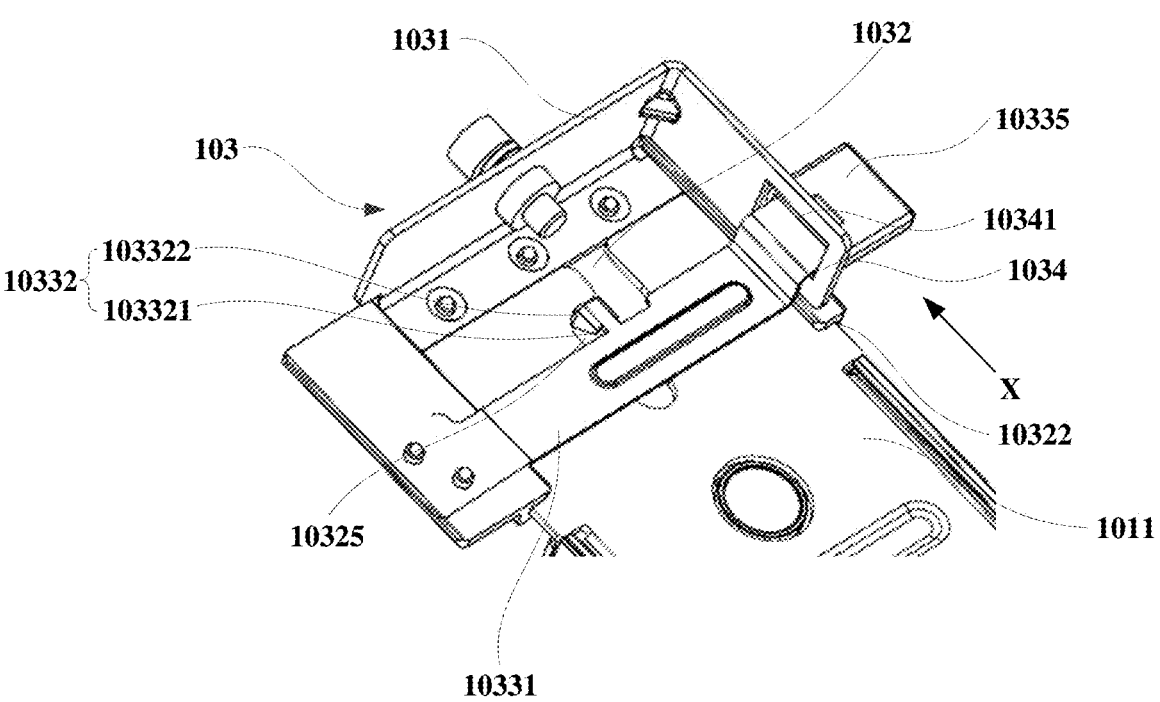
FIG. 10 is a diagram of another structure of a process of mounting a power converter to a mounting piece according to an embodiment.

When the mounting hole 10111 of the mounting ear 1011 moves to the hook 10332, interference between the hook 10332 and the mounting ear 1011 is broken, and the hook 10332 is inserted into the mounting hole 10111. In this case, relative positions of the mounting ear 1011 of the power converter 101 and the mounting piece 103 are shown in FIG. 10. FIG. 10 is a diagram of another structure of a process of mounting the power converter 101 to the mounting piece 103 according to an embodiment. In a status shown in FIG. 10, the mounting ear 1011 is located between the clipping structure 1033 and the support plate 1032, and when no external force is applied, the hook 10332 may limit movement of the mounting ear 1011 in the second direction, so that the mounting ear 1011 can be prevented from falling off from the mounting piece 103, to fasten the power converter 101, that is, mount the power converter 101 to the mounting piece 103.

Based on the foregoing descriptions of the process of mounting the power converter 101 to the mounting piece 103, in this embodiment, to facilitate the mounting ear 1011 to jack up the hook 10332 in the foregoing process, a guide structure may be disposed on the hook 10332. During specific implementation, still refer to FIG. 10. The hook 10332 includes a guide surface 103321. The guide surface 103321 is a surface that is of the hook 10332 and that is away from the fastening portion 1031. In addition, in the direction away from the fastening portion 1031, a spacing between the guide surface 103321 and the support surface 10321 of the support plate 1032 gradually increases. In this case, an included angle that is between the guide surface 103321 and the support surface 10321 and that is away from the fastening portion 1031 is an acute angle. The included angle between the guide surface 103321 and the support surface 10321 of the support plate 1032 is not limited in the embodiments. For example, the included angle may be 30°, 35°, 45°, 60°, or the like. The included angle may be designed based on a material of the hook 10332, a force that needs to be applied for jacking up the hook 10332, and the like.

Still refer to FIG. 10. The hook 10332 may further include a stop surface 103322. The stop surface 103322 faces the fastening portion 1031. When the hook 10332 is inserted into the mounting hole 10111, the stop surface 103322 abuts against a hole wall of the mounting hole 10111, to limit the movement of the mounting ear 1011 in the second direction. In this embodiment, a specific manner of disposing the stop surface 103322 is not limited. For example, the stop surface 103322 may be perpendicular to the support surface 10321 of the support plate 1032, or a spacing between the stop surface 103322 and the support surface 10321 gradually increases in the direction away from the fastening portion 1031. In this case, an included angle that is between the stop surface 103322 and the support surface 10321 and that is away from the fastening portion 1031 may be, for example, 30°, 35°, 45°, 60°, or the like. This helps improve reliability of a connection between the power converter 101 and the mounting piece 103.

In addition, refer to FIG. 9 and FIG. 10. In this embodiment, the support plate 1032 may be further provided with an avoidance hole 10325. The avoidance hole 10325 is disposed opposite to the hook 10332. The hook 10332 may be inserted into the avoidance hole 10325. In this way, when the power converter 101 is mounted to the mounting piece 103, the hook 10332 can be inserted into the avoidance hole 10325 while being inserted into the mounting hole 10111. This can effectively improve reliability of blocking, by the hook 10332, the movement of the mounting ear 1011 in the second direction. In this way, the reliability of the connection between the power converter 101 and the mounting piece 103 can be improved.

Still refer to FIG. 3*a*. After the power converter 101 is connected to the mounting piece 103, the power converter 101 may be accommodated in the accommodation space 1022 of the module frame 102, and a height of the power converter 101 is less than or equal to a height of the frame side 1021 in a direction perpendicular to the module 104, so that the power converter 101 can be completely hidden in the accommodation space 1022. This helps improve the packing rate of the photovoltaic module 1. In this way, the transportation costs of the photovoltaic module 1 can be reduced.

When the power converter 101 needs to be detached or replaced, the second end of the clamping portion 10331 may move in the direction away from the support plate 1032. When the hook 10332 is separated from the mounting hole 10111 of the mounting ear 1011, and the hook 10332 does not interfere with the movement of the mounting ear 1011 in the second direction, a force in the second direction may be applied to the power converter 101, so that the mounting ear 1011 can be extracted from between the clamping portion 10331 and the support plate 1032 in the direction away from the fastening portion 1031, to detach the power converter 101 from the mounting piece 103.

In the photovoltaic module 1 provided in the embodiments, the clipping structure 1033 of the mounting piece 103 may be fastened to the mounting hole 10111 of the mounting ear 1011 of the power converter 101 in a movable and snapping manner, to clip and fasten the mounting ear 1011, so that the power converter 101 is reliably connected to the mounting piece 103. In addition, the second end of the clamping portion 10331 of the clipping structure 1033 may move in the direction away from the support plate 1032, to extract the mounting ear 1011 from between the clipping structure 1033 and the support plate 1032. In this way, the power converter 101 is quickly detached from the mounting piece 103. Therefore, in the photovoltaic module 1, the mounting ear 1011 is detachably connected to the clipping structure 1033, so that the power converter 101 is detachably connected to the mounting piece 103. This can effectively improve efficiency of mounting the power converter 101 to the mounting piece 103 and efficiency of detaching the power converter 101 from the mounting piece 103.

It should be noted that the foregoing descriptions of the embodiments are merely examples of a specific structure of the mounting piece 103 and an implementation of a detachable connection between the power converter 101 and the mounting piece 103. In another possible embodiment, the mounting piece 103 may alternatively use another possible structure design, and the power converter 101 may alternatively be detachably connected to the mounting piece 103 in another possible manner. For example, the mounting ear 1011 of the power converter 101 may be connected to the support plate 1032 and/or the clamping portion 10331 of the mounting piece 103 in a manner such as magnetic attraction, and the power converter 101 is separated from the mounting piece 103 by overcoming a magnetic attraction force. It may be understood that, in the embodiments, a detachable connection between the power converter 101 and the mounting piece 103 may also be considered as a detachable connection between the power converter 101 and the support plate 1032 and/or the clamping portion 10331.

Figure 11:
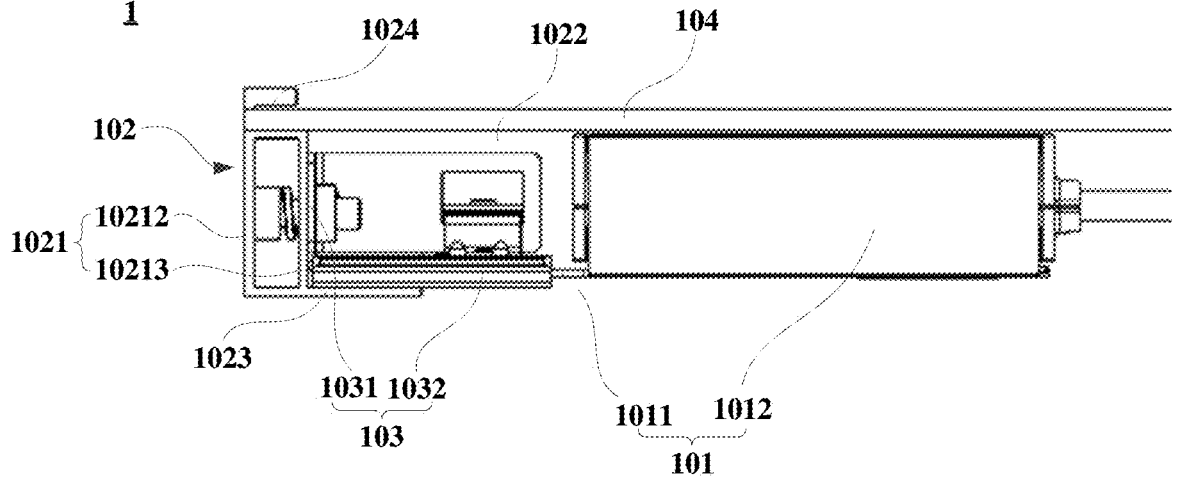
FIG. 11 is a side view of a photovoltaic module according to an embodiment.

FIG. 11 is a side view of the photovoltaic module 1 according to an embodiment. In this embodiment, the module frame 102 further includes a support portion 1023. The support portion 1023 is parallel to the module 104. The support portion 1023 extends from the frame side 1021 toward an inside of the accommodation space 1022 of the module frame 102. In this case, the support portion 1023 is located in the accommodation space 1022. In this embodiment, the support portion 1023 and the frame side 1021 may be an integral structure. In this case, the support portion 1023 may be understood as a bent portion of the frame side 1021. This can improve structural reliability of the module frame 102.

According to the foregoing descriptions of the structure of the mounting piece 103 in the embodiments, the support plate 1032 may also be parallel to the module 104. On this basis, the support plate 1032 of the mounting piece 103 may be attached to at least a part of the support portion 1023 of the module frame 102, so that the support portion 1023 can support the support plate 1032, to support the power converter 101. This can improve structural reliability of the photovoltaic module 1.

Because both the module 104 and the power converter 101 generate heat in a working process, to meet heat dissipation requirements of the module 104 and the power converter 101, in this embodiment, a spacing between the support plate 1032 of the mounting piece 103 and the module 104 may be greater than a thickness of the main body 1012 of the power converter 101. In this way, before the photovoltaic module 1 is delivered from a factory, when the power converter 101 is mounted to the mounting piece 103, the main body 1012 of the power converter 101 may be disposed close to the module 104 relative to the mounting ear 1011, so that the power converter 101 is connected to the mounting piece 103, to be hidden in the accommodation space 1022 of the module frame 102. In this case, the photovoltaic module 1 is in a status shown in FIG. 11. In this way, the packing rate of the photovoltaic module 1 in a transportation process can be ensured, and the transportation costs of the photovoltaic module 1 can be reduced.

It should be noted that, before the photovoltaic module 1 is delivered from a factory, in addition to mounting the power converter 101 outside the module frame 102 by using the mounting piece 103, the power converter 101 may be pre-wired to the module 104. This can further improve mounting efficiency of the photovoltaic module 1 at a construction site and reduce mounting costs.

It may be understood that, in the photovoltaic module 1 shown in FIG. 11, the fastening portion 1031 may be located between the module 104 and the support plate 1032. This can help reduce a size of the frame side 1021 of the module frame 102 in a direction from the module 104 to the support plate 1032. This helps implement a miniaturization design of the photovoltaic module 1. In addition, in the photovoltaic module 1 shown in FIG. 11, the frame side 1021 of the module frame 102 may include a first-layer mounting plate 10212 and a second-layer mounting plate 10213. The first-layer mounting plate 10212 and the second-layer mounting plate 10213 are spaced from each other in a direction from the outside of the accommodation space 1022 of the module frame 102 to the inside of the accommodation space 1022. The second-layer mounting plate 10213 is disposed close to the inside of the accommodation space 1022 relative to the first-layer mounting plate 10212. In this case, the fastening portion 1031 of the mounting piece 103 may be connected to the second-layer mounting plate 10213, and a part that is of a connection piece and that is configured to connect the fastening portion 1031 of the mounting piece 103 to the frame side 1021 may be accommodated in a gap between the first-layer mounting plate 10212 and the second-layer mounting plate 10213, so that the connection piece cannot be exposed outside the module frame 102. This can improve the packing rate of the photovoltaic module 1.

Figure 12:
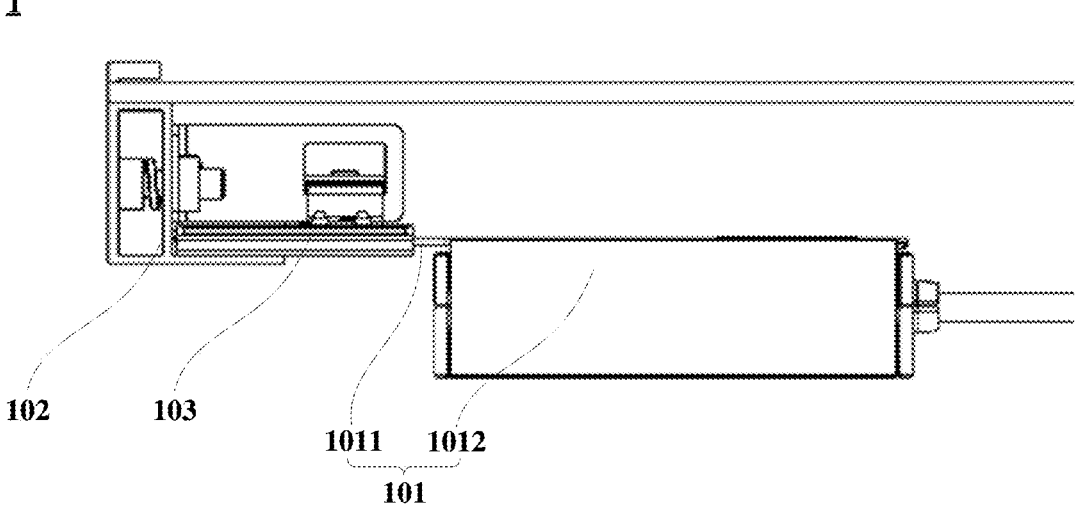
FIG. 12 is a diagram of a structure of the photovoltaic module shown in FIG. 11 during working.

When the photovoltaic module 1 shown in FIG. 11 is transported to a construction site, to meet heat dissipation requirements of the module 104 and the power converter 101 in a working process, the second end of the clamping portion 10331 may be lifted in the direction away from the support plate 1032, to detach the power converter 101 from the mounting piece 103. Then, the main body 1012 of the power converter 101 is turned over 180° in a direction away from the module 104, and then the power converter 101 is mounted to the mounting piece 103 based on the mounting processes shown in FIG. 8 to FIG. 10. In this case, the photovoltaic module 1 is in a status shown in FIG. 12. FIG. 12 is a diagram of a structure of the photovoltaic module 1 shown in FIG. 11 during working. In the status shown in FIG. 12, a surface that is of the main body 1012 of the power converter 101 and on which a heat dissipation apparatus is disposed is located on a side that is of the mounting ear 1011 and that is away from the module 104, to help implement effective heat dissipation of the power converter 101. In addition, there is a large gap between the main body 1012 of the power converter 101 and the module 104. This can help implement effective heat dissipation of the module 104.

In some application scenarios, the heat dissipation requirements of the power converter 101 and the module 104 are low. In this case, when the photovoltaic module 1 shown in FIG. 11 is transported to the construction site, the power converter 101 does not need to be detached, turned over, and re-mounted. This can further improve the mounting efficiency of the photovoltaic module 1 at the construction site and reduce the mounting costs.

It may be understood that, in the foregoing application scenario in which the heat dissipation requirements are low, in addition to the manner of disposing the mounting piece 103 shown in FIG. 11, in some possible embodiments, the support plate 1032 of the mounting piece 103 may be disposed close to the module 104 relative to the fastening portion 1031. In this case, the mounting ear 1011 of the power converter 101 is disposed close to the module 104 relative to the main body 1012.

The photovoltaic module 1 is designed by using the structure in any one of the foregoing embodiments. Before the photovoltaic module 1 is delivered from a factory, the power converter 101 may be mounted to the module frame 102 by using the mounting piece 103. In addition, because the mounting piece 103 and the power converter 101 may be located in the accommodation space 1022 of the module frame 102, the mounting piece 103 and the power converter 101 do not occupy additional space outside the module frame 102. In this case, when the photovoltaic module 1 is packed and transported, the packing rate of the photovoltaic module 1 can be effectively improved. In this way, the transportation costs of the photovoltaic module 1 can be reduced. In addition, because in the photovoltaic module 1 provided in the embodiments, the mounting piece 103 is detachably connected to the power converter 101, the power converter 101 is conveniently replaced. In this way, the photovoltaic module 1 is applicable to various types of power converters 101. This helps improve an application scope of the photovoltaic module 1, to improve market competitiveness of the photovoltaic module 1.

The photovoltaic module 1 provided in the foregoing embodiments may be used in, but is not limited to, the photovoltaic power generation system 100 shown in FIG. 1. Before the photovoltaic module 1 provided in the foregoing embodiment is delivered from a factory, the power converter 101 of the photovoltaic module 1 is pre-mounted to the module frame 102 by using the mounting piece 103. Therefore, when the photovoltaic module 1 is transported to a construction site of the photovoltaic power generation system 100, mounting efficiency of the photovoltaic module 1 can be effectively improved. In this way, mounting costs of the photovoltaic power generation system 100 are reduced. In addition, because the power converter 101 may be mounted to the mounting piece 103, to be hidden in the accommodation space 1022 of the module frame 102, the power converter 101 and the mounting piece 103 do not occupy additional space outside the module frame 102. In this case, when the photovoltaic module 1 is packed and transported, the packing rate of the photovoltaic module 1 can be effectively improved. In this way, the transportation costs of the photovoltaic module 1 can be reduced, and costs of the photovoltaic power generation system 100 are effectively reduced.

In a specific embodiment, the photovoltaic power generation system 100 may be a large power station or a micro power station. The micro power station may be located in an industrial park or a cell. Alternatively, the photovoltaic power generation system 100 may be a home photovoltaic power generation system or a photovoltaic power generation system of a device such as a vehicle.

The foregoing descriptions are merely specific implementations of the embodiments, but are not intended as limiting. Any variation or replacement readily figured out by a person skilled in the art shall fall within the scope of the embodiments.

What is claimed is:

1. A photovoltaic module, comprising:
a module;
a module frame;

a mounting piece; and a power converter, wherein the module covers the module frame, and an edge of the module is connected to the module frame;

the module frame comprises a plurality of frame sides, each frame side of the plurality of frame sides extends in a direction away from the module, and the plurality of frame sides is sequentially connected to enclose an accommodation space;

the mounting piece is located in the accommodation space, the mounting piece comprises a fastening portion and a support plate, the fastening portion is connected to the support plate, the fastening portion is connected to a side wall that is of one frame side and that faces the accommodation space, and the support plate extends toward an inside of the accommodation space in a direction away from the fastening portion; and the power converter is located in the accommodation space, is detachably connected to the support plate, wherein the power converter comprises a mounting ear, the mounting ear is of a plate structure, and the mounting ear comprises a mounting hole; and the mounting piece further comprises a clipping structure, the clipping structure is located in the accommodation space, the clipping structure is disposed on a surface that is of the support plate and that faces the module, the clipping structure is located between the module and the support plate, and the clipping structure is fastened to the mounting hole, in a movable and snapping manner, to clip and fasten the mounting ear, wherein a first end of the clipping structure is fastened to the support plate, and a second end of the clipping structure is configured to move in a direction away from and toward the support plate; and the mounting ear is located between the clipping structure and the support plate, to fasten the power converter, and the mounting ear is detachably connected to the clipping structure.

2. The photovoltaic module according to claim 1, wherein the support plate further comprises:

a first guide groove, a second guide groove, and a support surface, an opening of the first guide groove and an opening of the second guide groove are disposed opposite to each other, and are connected to each other through the support surface, extension directions of the first guide groove and the second guide groove are perpendicular to the fastening portion, the mounting ear is inserted into space enclosed by the first guide groove and the second guide groove, and the mounting ear is configured to slide along the first guide groove and the second guide groove.

3. The photovoltaic module according to claim 2, wherein the support plate further comprises:

a flat plate structure, a surface of the flat plate structure is parallel to the support surface, the flat plate structure is connected to the support surface through the second guide groove, and one end of the clipping structure is fastened to the flat plate structure.

4. The photovoltaic module according to claim 3, wherein the clipping structure comprises a clamping portion and a hook;

the clamping portion comprises a first end and a second end, the hook is located between the first end and the second end, the hook extends in a direction from the clamping portion to the support plate, the first end of the clamping portion is fastened to the flat plate structure, and the second end of the clamping portion is configured to move in a direction away from and toward the support plate; and the mounting ear is located between the clamping portion and the support surface, the hook is inserted into the mounting hole, and the hook is configured to limit movement of the mounting ear relative to the support plate in the direction away from the fastening portion.

5. The photovoltaic module according to claim 4, wherein, when the second end of the clamping portion moves in the direction away from the support plate, the hook is separated from the mounting hole, and the mounting ear is configured to be extracted from between the clamping portion and the support plate in the direction away from the fastening portion.

6. The photovoltaic module according to claim 4, wherein the clipping structure further comprises:

a lapping portion, the lapping portion is connected to the second end of the clamping portion, the lapping portion is of a step-shaped structure, and a spacing between a step surface of the lapping portion and the support surface is greater than a spacing between the clamping portion and the support surface.

7. The photovoltaic module according to claim 4, wherein the hook further comprises:

a guide surface, the guide surface is a surface that is of the hook and that is away from the fastening portion, and an angle that is between the guide surface and the support surface and that is away from the fastening portion is an acute angle.

8. The photovoltaic module according to claim 4, wherein the support plate further comprises:

an avoidance hole, the avoidance hole is disposed opposite to the hook, and the hook is inserted into the avoidance hole.

9. The photovoltaic module according to claim 2, wherein the mounting piece further comprises:

a baffle, the baffle is connected to the support plate through the first guide groove, the baffle is perpendicular to the module, the baffle is perpendicular to the fastening portion, the baffle comprises a through hole, and the clipping structure passes through the baffle via the through hole.

10. A method of mounting a power converter to a mounting piece, the method comprising:

inserting a mounting ear of the power converter between a clamping portion and a support plate through a gap between the clamping portion and the support plate;

sliding the mounting ear along a first guide groove and a second guide groove, wherein the first guide groove and the second guide groove guide movement of the mounting ear relative to the clamping portion and the support plate.

11. The method of claim 10, wherein a size of the first guide groove in a direction from the clamping portion to the support surface is less than a spacing between the clamping portion and the support surface.

12. The method of claim 10, wherein a size of the second guide groove in a direction from the clamping portion to the support surface is less than a spacing between the clamping portion and the support surface.

13. The method of claim 10, wherein a size of the first guide groove in a direction from the clamping portion to the support surface is greater than a size of the mounting ear in the direction from the clamping portion to the support surface.

14. The method of claim 10, wherein a size of the second guide groove in a direction from the clamping portion to the support surface is greater than a size of the mounting ear in the direction from the clamping portion to the support surface.

\* \* \* \* \*